(12) United States Patent
Glugla et al.

(10) Patent No.: US 9,897,020 B2
(45) Date of Patent: Feb. 20, 2018

(54) METHOD AND SYSTEM FOR ENGINE CONTROL

(71) Applicant: Ford Global Technologies, LLC, Dearborn, MI (US)

(72) Inventors: Chris Paul Glugla, Macomb, MI (US); Michael Damian Czekala, Canton, MI (US); Garlan J. Huberts, Milford, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 15/181,198

(22) Filed: Jun. 13, 2016

(65) Prior Publication Data

US 2017/0356359 A1 Dec. 14, 2017

(51) Int. Cl.
| | |
|---|---|
| *F02D 41/00* | (2006.01) |
| *F02P 5/15* | (2006.01) |
| *F02D 41/30* | (2006.01) |
| *F02D 41/26* | (2006.01) |
| *F02D 41/02* | (2006.01) |
| *F02P 5/04* | (2006.01) |
| *F02P 17/12* | (2006.01) |
| *F02D 41/16* | (2006.01) |

(52) U.S. Cl.
CPC ..... *F02D 41/0025* (2013.01); *F02D 41/0225* (2013.01); *F02D 41/16* (2013.01); *F02D 41/26* (2013.01); *F02D 41/3005* (2013.01); *F02P 5/045* (2013.01); *F02P 5/15* (2013.01); *F02P 17/12* (2013.01)

(58) Field of Classification Search
CPC .. F02D 41/0025; F02D 41/0225; F02D 41/16; F02D 41/26; F02D 41/3005; F02P 5/045; F02P 5/15; F02P 17/12
USPC .......... 701/104; 123/25 R, 25 A, 25 C, 25 E, 123/25 G
See application file for complete search history.

(56) References Cited

U.S. PATENT DOCUMENTS

| | | | |
|---|---|---|---|
| 6,360,587 | B1 | 3/2002 | Noel |
| 6,460,491 | B1 | 10/2002 | Stanglmaier et al. |
| 7,255,080 | B1 | 8/2007 | Leone |
| 7,673,614 | B2 | 3/2010 | Inada et al. |
| 7,740,009 | B2 | 6/2010 | Shelby et al. |

(Continued)

OTHER PUBLICATIONS

Glugla, Chris Paul et al., "Method and System for Ignition Control," U.S. Appl. No. 14/814,289, filed Jul. 30, 2015, 49 pages.

(Continued)

*Primary Examiner* — Mahmoud Gimie
(74) *Attorney, Agent, or Firm* — Julia Voutyras; McCoy Russell LLP

(57) ABSTRACT

Methods and systems are provided for reducing a spark plug soot load and a combustion chamber soot load by controlling spark plug timing while injecting water or washer fluid. In one example, water or washer fluid is injected during a torque reduction while advancing spark timing so as to provide at least a portion of the torque reduction while opportunistically cleaning soot from the spark plug and combustion chamber. By reducing spark plug soot load, misfire occurrence is reduced, while pre-ignition occurrence is reduced by decarbonizing the combustion chamber.

20 Claims, 4 Drawing Sheets

(56) References Cited

U.S. PATENT DOCUMENTS

| | | |
|---|---|---|
| 7,886,729 B2 | 2/2011 | Russell et al. |
| 8,073,613 B2 | 12/2011 | Rollinger et al. |
| 8,265,859 B2 | 9/2012 | Rollinger et al. |
| 8,406,984 B2 | 3/2013 | Glugla et al. |
| 8,434,431 B2 | 5/2013 | Fried et al. |
| 8,447,502 B2 | 5/2013 | Rollinger et al. |
| 8,463,533 B2 | 6/2013 | Glugla et al. |
| 8,543,315 B2 | 9/2013 | Glugla et al. |
| 8,985,089 B2 | 3/2015 | Gray, Jr. et al. |
| 9,043,122 B2 | 5/2015 | Glugla et al. |
| 9,169,755 B2 | 10/2015 | Ulrey et al. |
| 9,188,056 B2 | 11/2015 | Glugla et al. |
| 2011/0073070 A1* | 3/2011 | Ruhland ............... F01N 3/101 123/406.19 |
| 2014/0081556 A1 | 3/2014 | Estefanous et al. |
| 2015/0176558 A1 | 6/2015 | Glugla et al. |

OTHER PUBLICATIONS

Glugla, Chris Paul et al., "Method and System for Ignition Control," U.S. Appl. No. 14/814,764, filed Jul. 31, 2015, 38 pages.

\* cited by examiner

METHOD AND SYSTEM FOR ENGINE CONTROL

FIELD

The present description relates generally to methods and systems for improving spark plug and combustion chamber health via water injection.

BACKGROUND/SUMMARY

Engine ignition systems may include a spark plug for delivering an electric current to a combustion chamber of a spark-ignited engine to ignite an air-fuel mixture and initiate combustion. Based on engine operating conditions, spark plug fouling can occur wherein a firing tip of the spark plug becomes coated with a foreign substance, such as fuel, oil, or soot. Once fouled, the spark plug may be unable to provide adequate voltage to trigger cylinder combustion until the spark plug is sufficiently cleaned or replaced. For example, the spark plug may be cleaned by operating the engine in speed-load conditions that sufficiently raise the spark plug tip temperature, thereby burning off the accumulated soot. However, high spark plug tip temperatures may result in the pre-ignition of fuel. Avoiding pre-ignition is made more difficult in engines that inject washer fluid to improve knock limits and fuel economy. In particular, methanol contained within washer fluid has a lower surface ignition temperature than gasoline, making methanol more prone to pre-ignition than gasoline if spark plug tip temperatures are too high. As such, it may be difficult to provide a spark plug having a heat range that is hot enough at light loads to burn off accumulated soot, but cool enough at high loads to avoid pre-ignition.

One example approach for mitigating spark plug fouling and pre-ignition is shown by Russell et al. in U.S. Pat. No. 7,886,729. Therein an engine system includes two spark plugs in an engine cylinder, each spark plug operating at different heat ranges in order to avoid misfire and pre-ignition. Responsive to a combustion chamber temperature, the spark plugs are selectively operated above a fouling range and below a pre-ignition range specific to each spark plug. The fouling and pre-ignition ranges of each spark plug are selected so that one spark plug may be operated at higher temperatures and the other spark plug may be operated at lower temperatures, reducing the likelihood of misfire due to spark plug fouling and pre-ignition due to high spark plug tip temperatures.

However, the inventors herein have recognized potential issues with such systems. As one example, the fouling ranges of both spark plugs may overlap over a range of combustion chamber temperatures. That is, at certain combustion chamber temperatures neither spark plug may be able to provide reliable ignition. To address this issue, an engine controller may quickly transition between operating conditions to avoid operating at these temperatures, but a quick change in engine operating conditions may cause torque disturbances and associated issues. On the other hand, if the controller does not quickly transition between acceptable operating conditions and operates in the fouling range of both spark plugs, the spark plugs may become soot fouled, leading to cylinder misfire events. In addition, since this engine system utilizes two spark plugs in a combustion chamber, component cost and engine complexity is increased. Further, pre-ignition may be induced by the presence of carbon deposits in the combustion chamber.

In one example, the issues described above may be addressed by a method for an engine comprising, in response to a torque reduction request received while a predicted engine soot load is higher than a threshold soot load, injecting a fluid into an intake manifold, and adjusting spark ignition timing based on the fluid injection. The fluid may include water or washer fluid. In this way, the fluid may be used to decarbonize the fouled spark plug and limit the occurrence of engine misfires and also decarbonize deposits from a combustion chamber to limit knock and pre-ignition incidence.

As one example, an engine may be configured with a low heat range spark plug to reduce incidence of pre-ignition at high engine speed and load conditions. As such, the low heat range spark plug may not get warm enough to burn off soot deposits from a fouled spark plug. Therefore during conditions when the spark plug needs to be cleaned (such as when the spark plug soot load is higher than a threshold), and/or when the combustion chamber needs to be cleaned (such as when the combustion chamber soot load is higher than a threshold), an amount of washer fluid (including water and methanol) may be injected to decarbonize the spark plug and the combustion chamber. Since the washer fluid injection slows the combustion rate, knock and pre-ignition are reduced, allowing the engine to be operated with more spark advance. Thus while injecting the fluid, spark timing may be maintained or advanced. By advancing the spark timing, more heat is retained in the combustion chamber, thereby increasing the heat transferred to the spark plug and the combustion chamber, burning off the accumulated soot deposits. The engine controller may also determine if there is an upcoming torque reduction request, such as due to a transmission gearshift. If so, the fluid injection can be performed opportunistically during the transmission shift, enabling a reduction in engine torque output and a concurrent cleaning of the soot load. The amount of fluid injected may be adjusted based on the amount of soot load on the spark plug or the combustion chamber, a likelihood of abnormal combustion due to pre-ignition, knock, or misfire, and where the injection is performed during a torque reduction, the desired torque reduction. The amount of fluid injected may be increased as the spark plug or combustion chamber soot load increases, and/or as the desired torque reduction increases. By injecting the fluid during the transmission shift, the engine can be decarbonized while the need for spark retard during the torque reduction is decreased, improving fuel economy. In some examples, in addition to adjusting the amount of washer fluid injected, a rate of the injection may be adjusted based on the soot load, desired torque reduction amount, likelihood of pre-ignition, knock incidence, etc. For example, higher rates of injection may be used to decarbonize the spark plug and combustion chamber at higher soot loads. The amount and rate of washer fluid injection may also be adjusted based on the methanol content of the washer fluid to account for the increased propensity of methanol for pre-ignition (due to its lower surface ignition temperature). While the above example discusses the injection of washer fluid, in alternate examples, the soot load may be addressed by injecting water.

In this way, water or washer fluid injection may be used to reduce spark plug soot fouling and limit misfire occurrence. In addition, carbon deposits can be cleaned from the combustion chamber, limiting pre-ignition occurrence. The technical effect of injecting water or washer fluid during a torque reduction event is that engine torque output may be lowered with reduced need for spark retard while a spark plug and combustion chamber are concurrently cleaned. In particular, the injected water or methanol absorbs combustion heat, slowing the combustion rate. Due to the slowed rate of combustion, torque delivery is reduced, thereby reducing spark retard usage and increasing fuel economy. At the same time, the injected water (and methanol) may vaporize to form steam that may clean the spark plug and the combustion chamber. The injection of washer fluid or water also allows the engine to be operated with more spark advance, allowing for more heat to be retained in the cylinder, improving decarbonization efficiency. By cleaning the spark plug and combustion chamber deposits, abnormal combustion due to misfire, knocking, and pre-ignition is reduced. In addition, spark plug life is extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
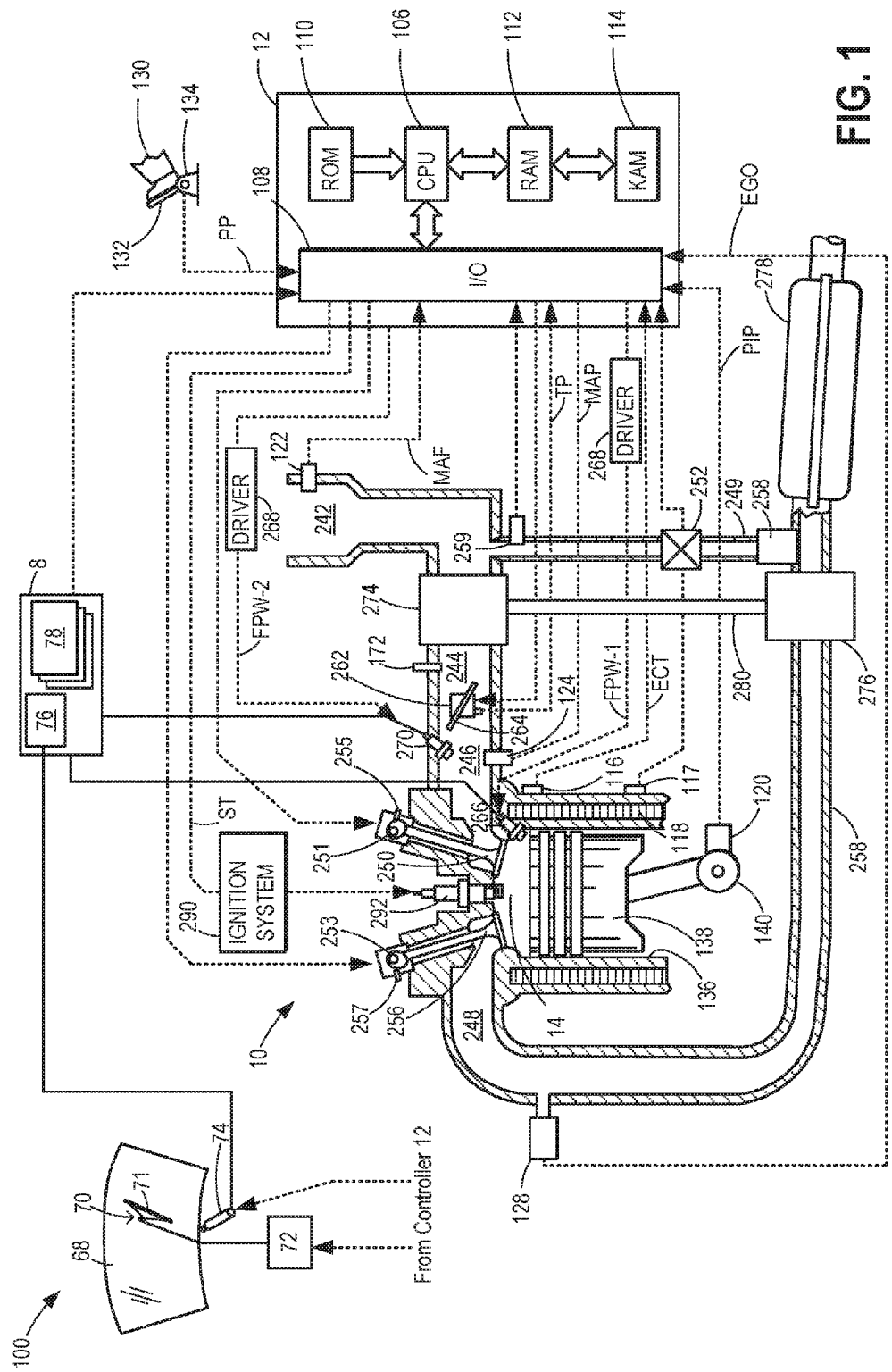
FIG. 1 shows an example embodiment of an engine system configured for injection of fuel and fluid into an engine.

The following description relates to systems and methods for reducing a spark plug and combustion chamber soot load in an engine, such as in the engine of FIG. 1. In addition to fuel, the engine may be configured to inject an additional fluid, such as water or washer fluid, into a combustion chamber or into the intake manifold during selected conditions. An engine controller may be configured to perform a control routine, such as the example routines of FIGS. 2-3, to reduce the soot load by adjusting spark timing while injecting water or washer fluid. An amount, timing, and flow rate of the fluid injection may be adjusted in response to engine operating conditions and washer fluid alcohol content. The controller may opportunistically inject the fluid concurrent to a torque reduction request so that the fluid injection can be used both to reduce an engine torque output and generate steam to clean out the carbon deposits from the spark plug and the combustion chamber. An example soot load reduction operation is shown with reference to FIG. 4. In this way, spark plug soot load may be reduced more effectively.

FIG. 1 depicts an engine system 100 for a vehicle. As one non-limiting example, engine system 100 can be included as part of a propulsion system for a passenger vehicle. Engine system 100 includes engine 10 which comprises a plurality of cylinders. FIG. 1 describes one such cylinder or combustion chamber in detail. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Engine 10 is coupled in a vehicle system that includes a windshield wiper system that enables cleaning of a vehicle windshield 68. Windshield 68 may be a front or rear windshield of a vehicle. The windshield wiper system includes at least one windshield wiper 70 operated by wiper motor 72. In response to an operator demand, and based on input from controller 12, wiper motor 72 may be energized causing wiper 70 to make multiple sweeping cycles known as wipes or sweeps over windshield 68. The wipes or sweeps enable wiper blade 71 to remove moisture, debris, and foreign particles from the surface of windshield 68. While operating wiper motor 72 and while wiper blade 71 is sweeping, based on request from a vehicle operator, controller 12 may intermittently inject or squirt a wiper fluid (herein also referred to as a washer fluid) onto the windshield via wiper injector 74. Washer fluid may be stored in a reservoir 76 from where it is delivered to the windshield. As elaborated herein, reservoir 76 may be further coupled to the intake passage and/or engine cylinders. This allows the washer fluid to be injected to reduce spark plug soot load in addition to being used for windshield wiping purposes. Specifically, the washer fluid may be injected into the intake manifold, specifically into intake passage 246, downstream of an intake throttle 262, during high soot load conditions, thereby enabling the washer fluid to be used to reduce spark plug soot load. Additionally, or alternatively, washer fluid may be directly injected into an engine cylinder via a direct injector, such as via the direct fuel injector 266 or a dedicated direct injector, to reduce spark plug soot load. The washer fluid stored in reservoir 76 may include a combination of water and alcohol, such as methanol or isopropanol. However, the washer fluid does not contain any gasoline.

As such, there may be significant variation in the water:alcohol content of the washer fluid. To enable the washer fluid to be reliably used to clean a soot load without causing engine misfire events, such as pre-ignition, a composition of the washer fluid may need to be known. During selected conditions, such as immediately after the washer fluid reservoir has been refilled, the washer fluid composition may be estimated and updated in the controller's memory. In one example, an intake oxygen sensor, such as sensor 172, may be used to estimate the water to alcohol content of the wiper fluid. Alternatively, an exhaust gas oxygen sensor, such as sensor 128, may be used to estimate the water to alcohol content of the wiper fluid.

Cylinder 14 can receive intake air via a series of intake air passages 242, 244, and 246. Intake air passage 246 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 274 arranged between intake passages 242 and 244, and an exhaust turbine 276 arranged along exhaust passage

248. Compressor 274 may be at least partially powered by exhaust turbine 276 via a shaft 280 where the boosting device is configured as a turbocharger. However, in other examples, such as where engine 10 is provided with a supercharger, exhaust turbine 276 may be optionally omitted, where compressor 274 may be powered by mechanical input from a motor or the engine. A throttle 262 including a throttle plate 264 may be provided along an intake passage of the engine for varying the flow rate and/or pressure of intake air provided to the engine cylinders. For example, throttle 262 may be disposed downstream of compressor 274 or, alternatively, may be provided upstream of compressor 274.

Exhaust passage 248 may receive exhaust gases from other cylinders of engine 10 in addition to cylinder 14. Exhaust gas sensor 128 is shown coupled to exhaust passage 248 upstream of emission control device 278. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 278 may be a three way catalyst (TWC), NOx trap, various other emission control devices, or combinations thereof.

Exhaust temperature may be measured by one or more temperature sensors (not shown) located in exhaust passage 248. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 250 and at least one exhaust poppet valve 256 located at an upper region of cylinder 14. In some embodiments, each cylinder of engine 10, including cylinder 14, may include at least two intake poppet valves and at least two exhaust poppet valves located at an upper region of the cylinder.

Intake valve 250 may be controlled by controller 12 by cam actuation via cam actuation system 251. Similarly, exhaust valve 256 may be controlled by controller 12 via cam actuation system 253. Cam actuation systems 251 and 253 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 250 and exhaust valve 256 may be determined by valve position sensors (not shown) and/or camshaft position sensors 255 and 257, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 292 for initiating combustion. Ignition system 290 can provide an ignition spark to combustion chamber 14 via spark plug 292 in response to spark timing signal ST from controller 12, under select operating modes. The ignition system 290 may include an induction coil ignition system, in which an ignition coil transformer is connected to each spark plug of the engine. As the engine operates, the firing tip of the spark plug may become coated with a foreign substance, such as soot, leading to spark plug fouling. Once fouled, the spark plug may be unable to provide adequate voltage to trigger cylinder combustion, resulting in misfire events, and even abnormal combustion events such as knock or pre-ignition. Based on the amount of accumulation, the spark plug may need to be periodically cleaned to restore spark plug function. Several methods to address the reduction of a spark plug soot load are discussed herein with respect to FIGS. 2 and 3. As described therein, the spark plug may be decarbonized by injecting water or washer fluid, by increasing an engine idling speed, and/or by advancing spark timing.

In some embodiments, each cylinder of engine 10 may be configured with one or more injectors for providing fuel. Cylinder 14 is shown including fuel injectors 266 and 270. Fuel injector 266 is shown coupled directly to cylinder 14 for injecting fuel directly therein in proportion to the pulse width of signal FPW-1 (fuel pulse width-1) received from controller 12 via electronic driver 268. In this manner, fuel injector 266 provides what is known as direct injection (hereafter also referred to as "DI") of fuel into combustion cylinder 14. While FIG. 1 shows injector 266 as a side injector, it may also be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 266 from a high pressure fuel system 8 including one or more fuel tanks 78, fuel pumps, and a fuel rail. Further, while not shown, fuel tanks 78 may have a pressure transducer providing a signal to controller 12. In some examples, fuel injector 266 may also be used to inject water or washer fluid drawn from reservoir 76 directly into the combustion chamber of cylinder 14.

Fuel injector 270 is shown coupled to the intake port of cylinder 14 for port injecting fuel into the intake port upstream of cylinder 14 in proportion to the pulse width of signal FPW-2 (fuel pulse width-2) received from controller 12 via electronic driver 271. In this manner, fuel injector 270 provides what is known as port injection (hereafter also referred to as "PFI") of fuel into combustion cylinder 14.

It will be appreciated that in alternate embodiments, the engine system may include multiple injectors coupled to each cylinder, such as multiple direct injectors, multiple port injectors, or at least one direct injector and one port injector. In one example, the port injector may be used to deliver water or washer fluid drawn from reservoir 76 into the intake port upstream of cylinder 14 while the direct injector is used to deliver fuel, such as gasoline, into the cylinder.

Fuel may be delivered by the injector to the cylinder during a single cycle of the cylinder. Further, the distribution and/or relative amount of fuel delivered from the injector may vary with operating conditions, such as aircharge temperature. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks 78 in fuel system 8 may hold fuel with different qualities, such as different compositions. These differences may include, different octane, different heat of vaporizations, different fuel blends, different flammability limits, and/or combinations thereof etc. Moreover, characteristics of the fuel or other engine injection fluids stored in the fuel tank may vary frequently. The day to day variations in tank refilling can thus result in frequently varying fuel compositions, thereby affecting the fuel composition delivered by injector 266.

In addition to the fuel tanks, fuel system 8 may also include a reservoir 76 for storing additional fluids, such as a knock control fluid. These additional fluids may have different compositions, such as alcohol, alcohol content, water content, etc. The fluid may be used for knock control and also to decarbonize a spark plug. In one example, the fluid is one of water and washer fluid, wherein the washer fluid includes at least methanol. In another example, knock control fluids with different alcohol contents could include one being ethanol and another being methanol. Other alcohol containing washer fluids could be a mixture of alcohol and water, a mixture of alcohols, water, etc. In still another example, washer fluids held within the tanks 76 may include two alcohol blends wherein the first washer fluid may be a water alcohol blend with a lower ratio of alcohol than a water alcohol blend of a second washer fluid with a greater ratio of alcohol, such as a washer fluid which is approximately 50% methanol as a first washer fluid and a second washer fluid which is approximately 75% methanol. Additionally, the first and second washer fluids may also differ in other qualities such as a difference in temperature, viscosity, octane number, latent enthalpy of vaporization, etc.

While reservoir 76 is depicted as being distinct from the one or more fuel tanks 78, it will be appreciated that in alternate examples, reservoir 76 may be one of the one or more fuel tanks 78. Reservoir 76 may be coupled to direct injector 266 so that wiper fluid can be directly injected into cylinder 14. Likewise, reservoir 76 may be coupled to a dedicated fluid injector 270 so that wiper fluid may be directly injected into cylinder 14 or the intake manifold via intake passage 246. The fuel system may also include a reservoir for storing water that is coupled to the direct injector (or a dedicated fluid injector) so that water may be direct injected into the cylinder, or intake manifold. During some conditions, such as during an engine torque reduction, an engine controller may inject wiper fluid or water into the intake manifold, downstream of the intake throttle, to opportunistically clean soot from a spark plug while also providing at least a portion of the required torque reduction. It will be appreciated that injection of water/washer fluid may be used to clean soot as well as other substances present in a combustion chamber (e.g., fuel, oil). Additionally, it will be appreciated that injection of water/washer fluid may also be used to clean soot and other substances from components within a combustion chamber (e.g., fuel injector, air intake and outlet valves).

The engine may further include one or more exhaust gas recirculation passages for diverting at least a portion of exhaust gas from the engine exhaust to the engine intake. FIG. 1 shows a low pressure EGR (LP-EGR) system, but an alternative embodiment may include only a high pressure EGR (HP-EGR) system, or a combination of both LP-EGR and HP-EGR systems. The LP-EGR is routed through LP-EGR passage 249 from downstream of turbine 276 to upstream of compressor 274. The amount of LP-EGR provided to the intake manifold may be varied by controller 12 via LP-EGR valve 252. The LP-EGR system may include LP-EGR cooler 258 to reject heat from the EGR gases to engine coolant, for example. When included, the HP-EGR system may route HP-EGR through a dedicated HP-EGR passage (not shown) from upstream of turbine 276 to downstream of compressor 274 (and upstream of intake throttle 262), via an HP-EGR cooler. The amount of HP-EGR provided to the intake manifold may be varied by controller 12 via an HP-EGR valve (not shown).

Under some conditions, the EGR system may be used to regulate the temperature of the air and fuel mixture within combustion chamber 14. Thus, it may be desirable to measure or estimate the EGR mass flow. For example, one or more sensors 259 may be positioned within LP-EGR passage 249 to provide an indication of one or more of a pressure, temperature, and air-fuel ratio of exhaust gas recirculated through the LP-EGR passage. Exhaust gas diverted through LP-EGR passage 249 may be diluted with fresh intake air at a mixing point located at the junction of LP-EGR passage 249 and intake passage 242. In some examples, where an air intake system (AIS) throttle 141 is included in intake passage 242, upstream of compressor 274, by adjusting LP-EGR valve 252 in coordination with the air intake system throttle 141, a dilution of the EGR flow may be adjusted.

A percent dilution of the LP-EGR flow may be inferred from the output of a sensor in the engine intake gas stream. For example, a sensor 172 positioned downstream of LP-EGR valve 252, and upstream of main intake throttle 262, may be used so that the LP-EGR dilution at or close to the main intake throttle may be accurately determined. Sensor 172 may be, for example, an oxygen sensor. In addition, during selected conditions, sensor 172 may be used for estimating the alcohol content of fuel delivered to the engine, as well as the alcohol content and composition of a knock control fluid delivered to cylinder 14.

Engine 10 further includes a knock sensor 117 for detecting and differentiating knock and pre-ignition. The output of the knock sensor 117 may be used to determine a knock count, and a pre-ignition count of the engine based on the output of the sensor in defined crank angle timing windows, the output compared to relative to corresponding thresholds. For example, knock may be determined based on a lower amplitude vibration detected shortly after ignition in a cylinder while pre-ignition is determined based on a higher amplitude vibration detected before ignition in the cylinder.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and composition sensors coupled to the fuel tank(s) of the fuel system. Controller 12 may also receive an operator request for windshield wiping via a dedicated sensor (not shown). In response to the signals received from the various sensors, the controller may operate various engine actuators. Example actuators include fuel (and/or fluid) injector 266, wiper motor 72, wiper injector 74, throttle 262, cams 251 and 253, etc. For example, in response to a higher than threshold soot load, the controller may actuate fuel injector 266, or a dedicated fluid injector (not shown), to inject water or washer fluid into cylinder 14 during an upcoming torque reduction to reduce the soot load. Further still, the water or washer fluid injection may be performed at moderate and high loads. If the slow burn resulting from the fluid injection reduces torque, the throttle can be opened to maintain driver demanded torque. Storage medium read-only memory 110 can be programmed with computer readable data representing instructions executable by processor 106 for performing the methods described below as well as other variants that are anticipated but not specifically listed. Example routines that may be performed are elaborated with reference to FIGS. 2-3.

In this way, the system of FIG. 1 provides an engine including a cylinder, a first injector for delivering a first fluid (fuel) into the cylinder, a second injector for delivering a second fluid (water or washer fluid) upstream of the cylinder, a transmission including a plurality of gears, a spark plug, a knock sensor, and a controller. The controller may be configured with computer-readable instructions stored on non-transitory memory to inject water/washer fluid into a cylinder while reducing spark retard to decrease an engine soot load, wherein the engine soot includes a spark plug soot load and a combustion chamber soot load. The controller may model a soot load of the spark plug and/or the combustion chamber based on engine operating conditions, and in response to the soot load being higher than a threshold load, the controller may inject the second fluid while advancing spark ignition timing by a smaller amount if a torque reduction event is predicted, and advance spark ignition timing by a larger amount and inject a smaller amount of fluid if the torque reduction event is not predicted.

Figure 2:
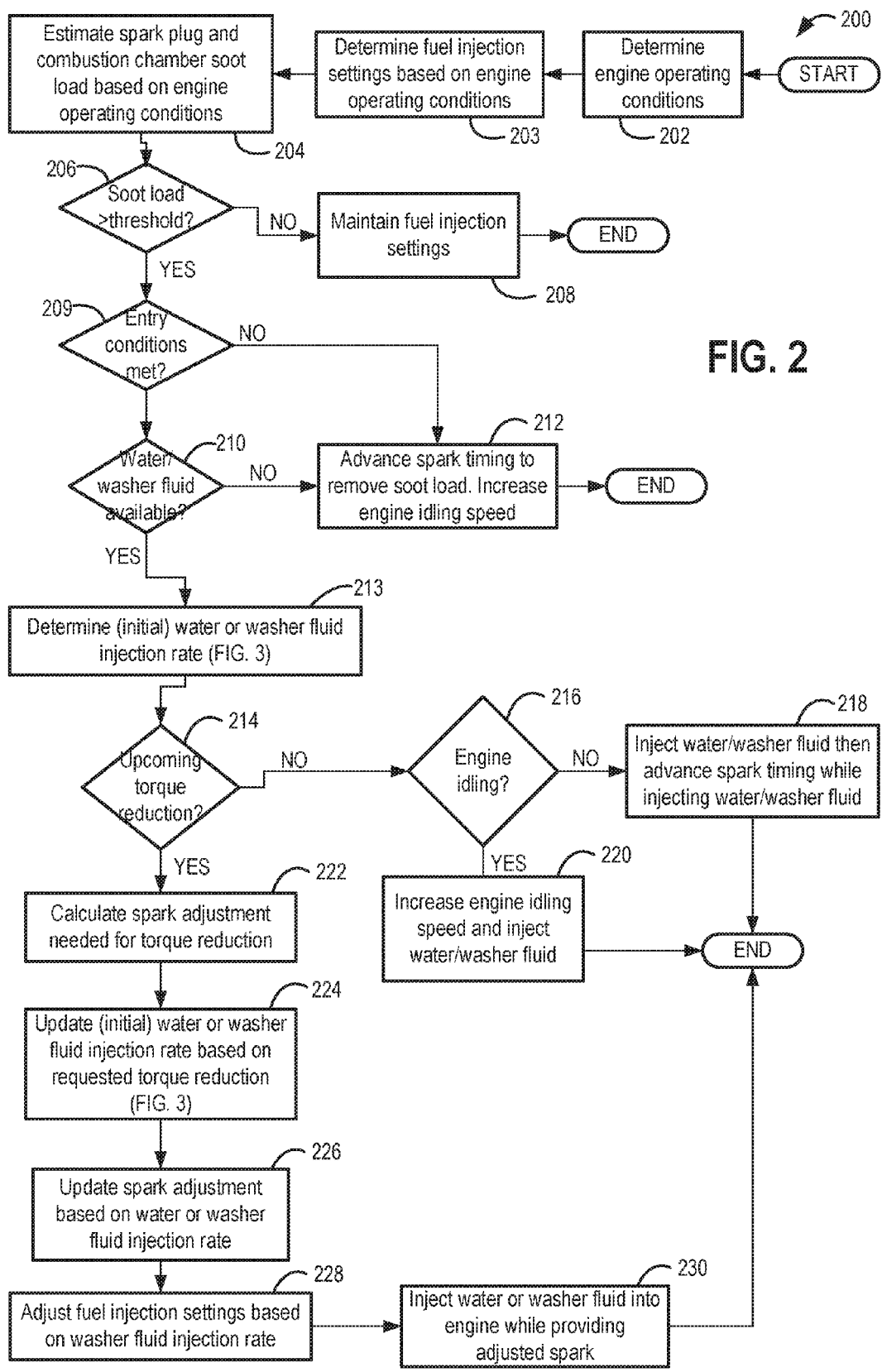
FIG. 2 shows a high level flowchart illustrating a routine that may be implemented to reduce spark plug soot load using water or washer fluid injection.

FIG. 2 shows an example routine 200 for adjusting spark timing as well as fuel, water, and/or washer fluid injection settings in response to spark plug soot fouling and/or combustion chamber soot accumulation. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ actuators of the engine system to adjust engine operation and fueling settings, according to the methods described below.

At 202, the method includes determining engine operating conditions, such as engine speed, pedal position, operator torque demand, ambient conditions (ambient temperature, pressure, humidity), engine temperature, spark plug ion current signal, engine exhaust temperature, exhaust air/fuel ratio, etc. At 203, fuel injection settings are determined based on the engine operating conditions. Fuel injection settings may include fuel injection amount, target combustion air/fuel ratio, fuel injection timing, fuel split ratio (e.g., amount of total fuel to be delivered via direct injection relative to port injection, and/or amount of total fuel to be delivered via intake stroke direct injection relative to compression stroke direct injection), and timing of spark plug ignition (herein also referred to as spark timing).

At 204, the method includes estimating or predicting an engine soot load based on engine operating conditions. The predicted engine soot load includes one of a predicted spark plug soot load and a predicted combustion chamber soot load. The spark plug soot load may be estimated or predicted based on one or more of a modeled spark plug tip temperature, an engine misfire count, and a measured ion leakage current. Further still, the soot load may be estimated based on a duration elapsed since a last spark plug cleaning. The combustion chamber soot load may be estimated or predicted based on one or more of a modeled combustion chamber temperature, an engine knock count, and an engine pre-ignition count. As one example, a predicted spark plug soot load may be based on one or more or each of an estimated or measured spark plug tip temperature, combustion chamber temperature, and an amount of time spent operating at a given air/fuel ratio and engine temperature. For example, as a duration of engine operation at richer than stoichiometry increases, the predicted soot load may increase. In another example, the amount of spark plug soot may be determined based on the spark plug current switch time. Therein an increasing spark plug current switch time may indicate a higher degree of spark plug fouling. In yet another example, the spark plug soot load may be based on various characteristics of a spark plug ion current signal, such as indication of secondary current flow during dwell. Likewise, a predicted combustion chamber soot load may be based on one or more or each of an estimated or measured in-cylinder temperature, an amount of time spent operating at a richer than stoichiometry air-fuel ratio, and an amount of time elapsed since a last cleaning of the combustion chamber.

The extent of spark plug soot fouling or combustion chamber soot loading may also be estimated based on a number of engine knock, pre-ignition, and/or misfire events that occur in a cylinder over a given amount of time. Engine knock and pre-ignition may be detected and differentiated based on the output of a knock sensor. Engine misfire may be determined based on the output of a crankshaft acceleration sensor. If a cylinder's misfire count is increasing, it may be determined that the spark plug soot load is increasing and possibly fouling. As spark plug soot load increases, a spark plug may not be able to reliably provide a spark at the desired time, causing unreliable combustion timing (e.g., a late burn) resulting in misfire. Spark plug soot load may also be determined by measuring an ion leakage current. As conductive carbon deposits build up on the spark plug, some current may be leaked due to the carbon deposits conducting current across the spark plug. Thus in response to an increase in leakage current, it may be determined that the spark plug is becoming increasingly soot fouled with the increase in conductive carbon deposits resulting in increased conduction of current across the spark plug. In comparison, if a cylinder's knock count is increasing, it may be determined that the combustion chamber soot load is increasing.

In other examples, the soot load may be determined by mapping out spark plug tip temperatures, and combustion chamber temperatures. Therein, an open loop model may be used based on operating conditions that include the time spent at light loads (e.g., less than threshold loads), time spent at certain selected air-fuel ratios, and time spent at warm versus cold engine conditions. As such, spark plug soot accumulation is higher when the engine is operating at lower loads, at richer than stoichiometry air-fuel ratios, and at colder engine conditions. In comparison, combustion chamber soot accumulation is higher when the engine is operating at higher loads, and at richer than stoichiometry air-fuel ratios. Still other engine behavior may be monitored in a closed-loop fashion to estimate the soot level, such as the indication of engine misfires (which indicate spark plug fouling) or excessive knock (which indicate combustion chamber deposits). Other spark plug fouling detection methods may include direct measurement (e.g., ion leakage current measurement).

At 206, the method includes determining if the estimated soot load exceeds a threshold soot load. For example, it may be determined if the estimated spark plug soot load is higher than a threshold soot load where the spark plug may be unable to ignite fuel for combustion, or if the estimated combustion chamber soot load is higher than a threshold soot load where the engine may pre-ignite or knock. The threshold soot load may be adjusted based on a pre-ignition count of the engine, to thereby pre-empt an occurrence of pre-ignition induced by a fouled combustion chamber. As such, the pre-ignition count of the engine may be indicative of the engine's (or a given cylinder's) propensity for pre-ignition. Thus the threshold soot load may be decreased as the pre-ignition count of the engine increases. Likewise, the threshold soot load may be adjusted based on a cylinder misfire count, the threshold decreased responsive to a higher misfire count.

If the estimated spark plug and/or combustion chamber soot load does not exceed the corresponding threshold soot load, then at 208, the method includes maintaining the fuel injection settings determined at 203 and operating the engine according to the determined fuel injection settings. For example, fuel may be injected via direct and/or port injection at a timing based on the engine operating conditions at 203.

In one example, in response to a torque reduction request received while the engine soot load is lower than the threshold load, fuel injection may be reduced corresponding to the reduction in torque request. In addition, spark timing may be retarded. The routine then ends.

If spark plug soot load (or engine soot load) exceeds the threshold load, then at 209, it may be determined if water/washer fluid injection entry conditions have been met. Entry conditions may be considered met if the engine is fully warmed up above coolant and oil temperature thresholds. As such, if the engine is not fully warmed up, it may not tolerate the slow combustion from the water/washer fluid injection, resulting in combustion instability. Upon confirming entry conditions for water injection, at 210, the method includes determining if water or washer fluid is available for soot removal (from the spark plug and/or the combustion chamber). For example, it may be determined if a reservoir of the fuel system for holding the fluid (such as reservoir 76 of FIG. 1) has water or washer fluid in it. If washer fluid is available, the composition of the washer fluid (including the alcohol or methanol content of the fluid) may be retrieved. In one example, the composition may have been updated in the controller's memory when the fluid was refilled in the reservoir. In addition to determining the nature of the fluid, it may be determined if there is enough fluid available to reduce the spark plug soot load. For example, it may be determined if the fluid level in the fluid reservoir is higher than a threshold level. The threshold level may in turn be adjusted based on the soot load (estimated at 202). As such, if the fluid level in the reservoir is too low, it may not be possible to reduce the spark plug and/or combustion chamber soot load using water/washer fluid injection. It should be understood that other knock control fluids (ethanol, methanol, ethanol water mixtures, etc.) may be used in place of water or washer fluid. In the below methods, it is expected that either water or washer fluid will be injected in an attempt to reduce spark plug and/or combustion chamber fouling.

If entry conditions for water injection are not met, or if water/washer fluid is not available for injection, then at 212, one or more alternate approaches (that are not fluid based) may be used to burn off the soot from the spark plug and the combustion chamber. As one example, spark timing may be advanced from maximum brake torque (MBT) spark timing to increase the spark plug tip temperature to burn off the spark plug soot load. The increased spark advance may also retain more heat in the combustion chamber, raising chamber temperature high enough to burn off the soot. In another example, the engine idling speed may be raised to burn off the additional soot.

The controller may determine an amount and duration of spark advance to apply based on engine operating conditions including one or more (or each) of ion sensor output, estimated soot load, engine temperature, engine load, EGR percentage, humidity, octane rating of fuel being combusted in the engine, air-fuel ratio, and air charge temperature. For example, as the ion sensor output rises above the threshold (and the indication of spark plug and/or combustion chamber fouling indicates a higher level of soot), the amount (or degree) of spark advance applied may be increased. Additionally or optionally, spark advance may be applied for a larger number of combustion events. As another example, at lighter engine loads, where the engine is not borderline limited, spark timing may be advanced of MBT timing. In comparison, if the engine is borderline limited, the amount of spark advance applied may be lower than that at a lightly loaded condition. In another example, as the air charge temperature increases, the degree of spark advance may be decreased. As yet another example, as the engine temperature increases, the degree of spark advance may be decreased. As still another example, as an amount (or percentage) of EGR used in the engine increases (that is, as engine dilution increases), the degree of spark advance may be increased. As yet another example, as an inferred fuel octane or charge humidity (e.g., ambient humidity) of the engine increases, the degree of spark advance may be increased. Further still, the degree of spark advance may be adjusted based on whether the engine is borderline spark limited or not, and further based on how far the engine is limited from borderline spark. As such, the amount and number of advanced spark events may be selected so as to sufficiently raise a spark plug tip temperature to a level that enables a significant portion of the accumulated soot to be burnt off.

In some examples, an ion sense signal may be used to indicate or inter an amount of heat in the spark plug. Further, it may be possible to estimate a rise in spark plug tip temperature with the ion signal, which may then be used as a feedback mechanism to vary the degree of spark advance and the number of combustion events of applying the first advanced spark timing (and/or the subsequent nominal spark timing). By advancing the sparking timing, more heat may be retained in the cylinder, resulting in hotter spark plugs, cylinders, and fuel injector tips.

The degree of spark advance applied may also be adjusted based on a knock or pre-ignition history of the engine, as indicated by the engine's pre-ignition and/or knock count. For example, if the engine has a higher knock or pre-ignition count, it may be determined that the engine has a higher propensity for knock or pre-ignition. Accordingly, to reduce the likelihood of inducing knock and/or pre-ignition while cleaning the spark plug and/or combustion chamber, the degree of spark advance for a first advanced spark event may be decreased and/or a number of spark advance events applied may be reduced. Furthermore, if the engine were knocking or pre-igniting, it would put more heat into the spark plug naturally. Therefore, the amount of advanced spark timing required to raise the spark plug tip temperature would be lower.

If sufficient fluid is available, then at 213, the method includes determining an (initial) amount of water/washer fluid to be injected based on the higher than threshold soot load. In addition, a rate of injection may be determined. The amount of injection may be increased as the soot load increases.

Next, at 214, the method includes determining if an upcoming torque reduction event is expected. In one example, a torque reduction request may be received due to one of a transmission gear shift, and traction control. The controller may use input from a vehicle navigational device (such as a GPS) that provides input regarding weather conditions, road conditions, predicted travel route, and operator driving behavior, to determine if traction control will be required (such as when rainy or snowy weather is predicted), or if a transmission upshift or downshift is expected (such as during uphill or downhill vehicle travel). In yet another example, torque reduction may be requested to protect an engine component from overheating. As one example, engine torque output may be limited to limit component over-heating (e.g., catalyst overheating). As elaborated herein, if an upcoming torque reduction event is expected, then a timing of the water or washer fluid injection may be adjusted to coincide with the torque reduction event so that at least a portion of the injection can be used to reduce the engine torque while concurrently decarbonizing the spark plug and/or combustion chamber. Injection of the control fluid may cool an air-fuel mixture during combustion, resulting in slowed combustion and a decrease in output torque. As such, this reduces the amount of spark retard required during the torque reduction event, providing fuel economy benefits.

If an upcoming torque reduction event is not expected, at 216, the method includes determining if the engine is currently in an idling condition. The engine may be in an idling condition when the engine is operating at an idle speed with driver torque demand lower than a threshold demand. If the engine is not currently idling, then at 218, the higher than threshold spark plug soot load may be reduced by injecting the determined amount of water or washer fluid into the combustion chamber at the determined injection rate. In addition, an intake throttle opening may be increased to maintain driver torque demand. Further, spark timing may be adjusted during the injection, where the adjusting spark timing includes advancing spark timing while injecting water or washer fluid. Spark timing is advanced to increase the spark plug tip temperature in order to burn off the spark plug soot load and increase heat retention within the combustion to burn off the deposits in the combustion chamber. Spark advance is knock limited, and so, injecting a knock control fluid, such as water or washer fluid, may extend the amount of spark plug advance that may be used before increasing a likelihood of engine knock. In particular, injection of water or washer fluid into the combustion chamber may reduce a charge air temperature in the combustion chamber, reducing the occurrence of knock, thereby extending the spark advance knock limits. This may allow for more spark advance and thereby higher spark plug tip temperatures and improved reduction of spark plug soot load. Spark may be advanced beyond nominal spark advance knock limits during injection of water/washer fluid. As the rate and/or amount of water or washer fluid injection is increased, the spark advance knock limits are improved, and so, an increasing amount of spark advance may be used during the injection. As a result, as the amount of water/washer fluid that is injected increases, the amount of spark advance that may be applied increases. In this way, while an engine operates at a non-idling engine condition and a spark plug soot load is above a threshold, water or washer fluid may be injected while advancing spark timing to reduce the spark plug soot load.

If the engine is currently in an idling condition, then at 220, the spark plug and/or combustion chamber soot load may be reduced by advancing spark timing from MBT and increasing the engine idling speed while injecting the determined amount of fluid at the determined injection rate. As the combustion chamber temperature increases, the spark plug tip temperature increases. Due to the increased engine idling speed, the spark plug tip temperature may become high enough to burn off the soot. The degree of increase of the engine idling speed, and the duration of operating with the elevated idling speed may be based on the estimated soot load. It will be appreciated that the water or washer fluid injection amount at idle conditions and light engine loads may be significantly less. In addition, if at idle in drive, the controller may be conservative about raising idle and creep speed. In one example, while in drive, the controller may send a signal to the brake module to increase brake pressure.

Returning to 214, if an upcoming torque reduction event is confirmed, the routine proceeds to 222 wherein a spark timing adjustment needed to provide the required torque reduction at the upcoming torque reduction event is calculated. In one example, the required spark timing adjustment may include spark timing being retarded by an amount from MBT to reduce torque by the desired amount. As the amount of torque reduction requested increases, the spark retard amount may be increased. By retarding spark timing, combustion occurs later in the piston cycle, reducing the amount of combustion energy that contributes to the power stroke, thereby reducing engine torque. However, the clean out time may remain the same to make sure deposits are removed. The same approach may also be used to clean the combustion chamber. There may be a maximum limit for raising the idle speed, such as not above 1200 RPM.

In another example, after a torque reduction from an initial torque to a final torque (above idle), and with a spark plug and/or combustion chamber soot load above a threshold, water or washer fluid may be injected while maintaining the engine at the final torque, then spark timing may be advanced while injecting water or washer fluid to reduce the soot load.

At 224, the amount and rate of water or washer fluid to be injected during the upcoming torque reduction is determined. This includes updating (e.g., increasing) the initial amount and rate of injection (that was determined as a function of the soot load) based on the requested torque reduction. Water or washer fluid may be injected at increased flow rates during a predicted torque reduction to reduce engine torque to a desired engine torque output, reducing the need for retarding spark to reduce torque. In particular, the injected water or washer fluid absorbs heat formed from combustion, slowing the combustion rate. Due to the slowed rate of combustion, torque delivery is reduced. A higher rate and amount of fluid injection may cause a larger torque reduction. Additionally, water or washer fluid injection may vaporize to form steam to clean the spark plug and the combustion chamber. The amount and rate of fluid injection may be adjusted based on each of the predicted engine soot load and the torque reduction request, the rate and amount of fluid injected increased as the predicted engine soot load increases, and as a larger torque reduction is requested. Adjusting the fluid injection amount and rate is elaborated at FIG. 3.

Since fluid injection reduces torque, as the rate and/or amount of fluid injection is increased, the amount of spark retard needed to provide the requested torque reduction may be decreased. This happens due to slowing of the burn rate via the injection, which results in the spark timing no longer being at the right location to provide the torque. Therefore at 226, the method includes updating a spark timing adjustment scheduled during the upcoming torque reduction. Therein, an initial amount of spark retard determined based on the desired amount of torque reduction (at 222) is decreased as the rate and/or amount of fluid injection increases. In one example, when the water or washer fluid is injected during a torque reduction, less spark retard may be concurrently required. In another example, the injected water or washer fluid alone may provide the requested torque reduction such that spark timing can be maintained at MBT timing during the injection (that is, no spark retard is used).

At 228, the method includes adjusting fuel injection settings for the engine based on the water/washer fluid injection. Due to the hydrocarbon content of methanol (or other alcohol present in washer fluid), the methanol in the washer fluid that is injected into the engine for cleaning the spark plug may also be combusted as fuel, contributing to the engine torque and combustion air-fuel ratio. If not compensated for, the washer fluid injection may result in a decrease in the combustion air-fuel ratio (that is, enrichment). Therefore, fuel injection settings including fuel injection amount and timing may be adjusted so that less fuel is injected during the combustion events concurrent to the injection of washer fluid to achieve a desired air/fuel ratio (e.g., stoichiometry) during the upcoming torque reduction. The controller may include instructions for adjusting injection of the fuel responsive to the alcohol content and injection amount of the washer fluid, wherein the injection of the fuel is decreased as the injecting of the washer fluid increases. In one example, the fuel includes gasoline, such as a gasoline-ethanol blend, while the washer fluid includes methanol, such as a methanol-water blend.

At 230, during the torque reduction, the updated amount of water or washer fluid may be injected into the combustion chamber at the updated flow rate. During the torque reduction, the updated spark timing adjustment and the updated fuel injection settings may be applied.

In some examples, during and after the water or washer fluid injection, the spark plug and/or combustion chamber soot load may be continually estimated using one or more of the methods discussed earlier (such as spark plug ionization current, frequency of knock and misfire, etc.) and the progress of the spark plug and/or combustion chamber cleaning may be monitored. In still other examples, following the spark plug and/or combustion chamber clean-up, a look-up table stored in the controller's memory may be updated based on the extent of spark plug and/or combustion chamber soot load cleaning achieved during the torque reduction with the determined amount and rate of injection. During subsequent spark plug cleaning routines, the fluid injection amount and/or rate may be updated based on the learning. In one example, if the spark plug was not adequately cleaned, water or washer fluid injection settings may be updated (e.g., increased) during a subsequent iteration of the routine. In another example, if the spark plug soot load was adequately reduced more quickly than estimated, water or washer fluid injection settings may be updated (e.g., decreased) during a subsequent iteration of the routine in order to conserve water or washer fluid. The routine then ends.

In still further examples, after the cleaning, the effectiveness of the cleaning may be assessed. For example, the cleaning procedure may be determined to have been effective responsive to a reduced tendency of the cylinder to knock or pre-ignite after injecting washer fluid at temperatures used to decarbonize the cylinder. Likewise, the cleaning procedure may be determined to have been effective responsive to a reduced tendency of the cylinder to misfire after injecting washer fluid at temperatures used to decarbonize the spark plug.

In some examples, additionally, an engine idling speed may be adjusted based on the prediction of a prior torque reduction event. For example, after a torque reduction event from an initial torque to a final, idling, torque, the engine idling speed may be increased. In still another example, after a torque reduction from an initial torque to a final torque, wherein the final torque includes idling, and while a spark plug soot load is above a threshold, a controller may inject water or washer fluid into the engine while maintaining the engine at the final torque to reduce at least a portion of the soot load. Thereafter, spark timing may be advanced while injecting water or washer fluid to further reduce the spark plug and/or combustion chamber soot load.

Figure 3:
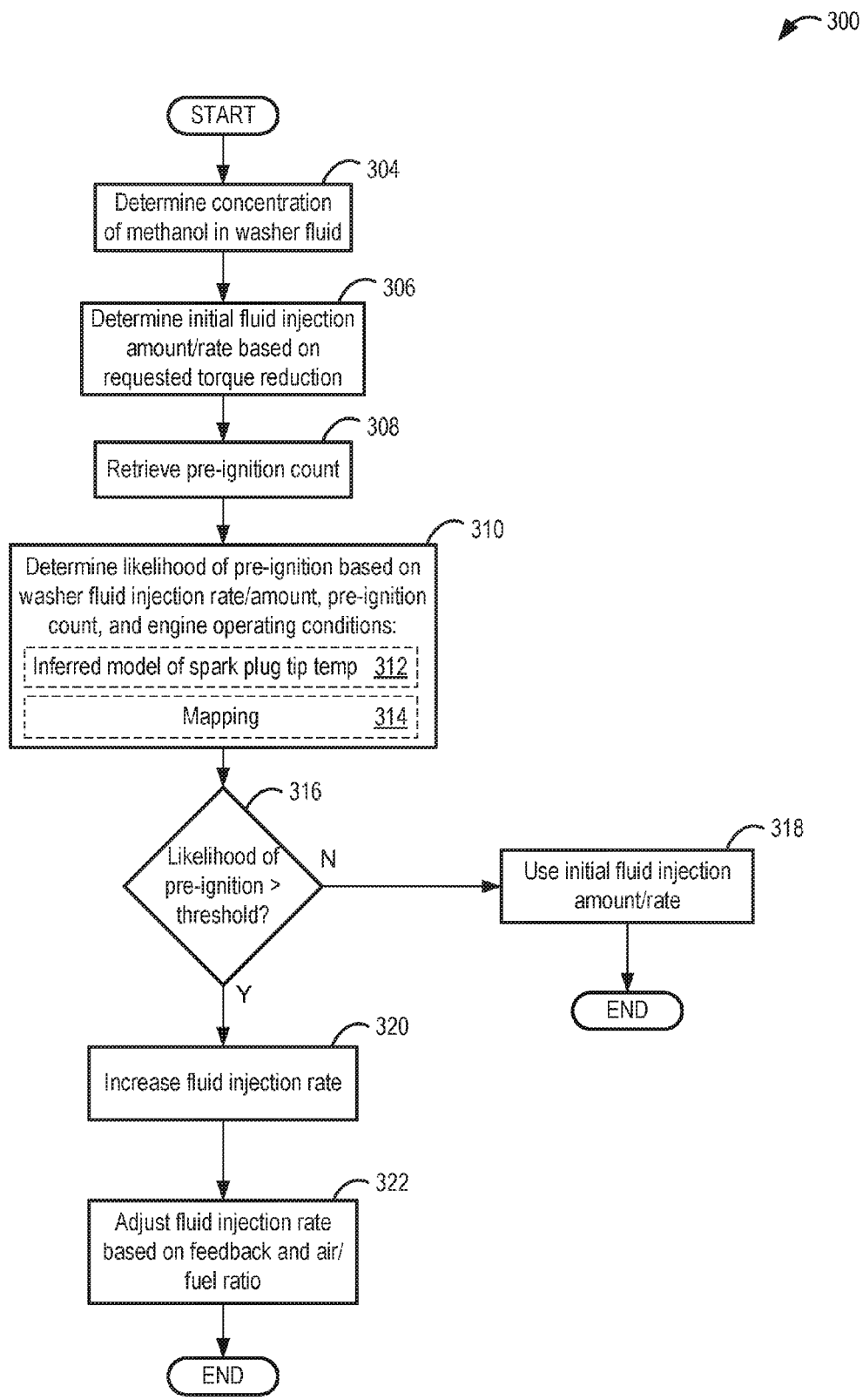
FIG. 3 shows a flowchart illustrating a routine that may be implemented to adjust spark timing and fluid injection settings.

FIG. 3 shows an example routine 300 for determining the injection rate of water or washer fluid (or another alcohol containing control fluid) to clean deposits in a cylinder combustion chamber. The injection settings may be adjusted to account for the pre-ignition propensity of methanol in washer fluid due to its lower surface ignition temperature relative to fuel (such as gasoline). The injection settings may also be adjusted when the injection is performed during an engine torque reduction event, such as during a transmission gear shift or during vehicle traction control. In one example, the routine of FIG. 3 may be performed as part of the routine of FIG. 2, (such as at step 224 and/or 213). The routine of FIG. 3 may also be used to determine the fluid injection rates and amounts for events other than torque reductions, such as at steps 218 or 220 of FIG. 2.

At 304, a concentration of methanol in the washer fluid is determined. The methanol content of washer fluid may be estimated based on, for example, the output an exhaust oxygen sensor, or an intake oxygen sensor. It will be understood that washer fluid may contain an alcohol other than methanol (e.g. isopropanol) and if so, the alcohol, content of the fluid may be similarly determined.

At 306, an initial rate and amount of washer fluid injection for an upcoming torque reduction is determined. The initial amount may be determined (e.g., using a look-up table stored in the controller's memory) based on engine operating conditions, determined methanol concentration of washer fluid, desired torque reduction, spark plug and/or combustion chamber soot load, and nature of torque reduction (e.g. gear shift, traction control, etc.). The rate and amount of control fluid injection may be increased in response to a higher estimated soot load or a larger desired torque reduction amount. Additionally, the type of torque reduction may affect fluid injection settings. For example, a gear shift may reduce torque quickly whereas traction control may decrease torque over an extended period of time, so the quick torque reduction may require a higher fluid injection rate, and a lower overall fluid injection amount, while the slower torque reduction due to traction control may require fluid to be introduced at a slower rate, but may require a higher overall amount of fluid injection over the course of the torque reduction. The amount of fluid injection may be limited by fluid availability, as determined by the fluid level of the water or washer fluid in the corresponding reservoir. Due to methanol's increased enthalpy of vaporization, washer fluid injection may reduce the combustion chamber temperature more effectively than water injection, and so, the rate/amount of washer fluid injection may be decreased if the methanol concentration of the washer fluid is higher.

In some examples, the controller may also check to see if the initial amount to be injected is sufficient for cleaning, if not, more fluid may be injected, and the intake throttle opening may be adjusted (e.g., increased) to maintain torque.

At 308, an engine (and/or cylinder-specific) pre-ignition count is retrieved from the controller's memory. The pre-ignition count may include information about the number of pre-ignition events that have occurred over a duration or distance of engine/vehicle operation, pre-ignition frequency in each engine cylinder, and whether washer fluid was injected prior to pre-ignition. Pre-ignition in a cylinder may be determined based on a higher than threshold output of a knock sensor in a crank angle timing window before spark event in the cylinder. In comparison, knock in the cylinder may be determined based on a higher than threshold output of the knock sensor in a crank angle timing window after spark event in the cylinder.

At 310, the method includes determining a likelihood of pre-ignition occurrence during (or due to) washer fluid injection based on engine operating conditions. For example, the controller may use an inferred model of the spark plug tip temperature (at 312) to determine the likelihood of pre-ignition. In one example, the spark plug tip temperature may be modeled based on engine speed and load conditions. The modeled spark plug tip temperature may be based on the extent and duration of high engine speed or engine load conditions. During high engine speed or load conditions, the spark plug tip temperature may become high enough to cause surface ignition of the methanol in the injected washer fluid, thereby inducing pre-ignition. This can be based on a mapped risk region or based on an inferred model of the spark plug tip temperature. Additionally the pre-ignition risk may be mapped as a function of the fraction of methanol in the washer fluid. The pre-ignition risk is elevated when the methanol injection is slightly rich of stoichiometric (0.9, to 0.8 lambda). For example, a stoichiometric air-fuel ratio may result in a lower pre-ignition risk, while the risk of pre-ignition may be higher at rich and lean of stoichiometry due to surface ignition temperature and combustion flame speed, a faster flame speed having less time for pre-ignition to occur.

As another example, the controller may use mapping techniques (at 314) to map engine operating conditions to the likelihood of pre-ignition. For example, pre-ignition incidence may be determined based on the amount of washer fluid to be injected, a rate at which the fluid is to be injected, the methanol content of the fluid, engine coolant temperature, the compression ratio of the engine, the air fuel ratio, spark advance and the engine's pre-ignition count.

At 316, the method includes determining if the estimated likelihood of pre-ignition is above a threshold likelihood. If the likelihood of pre-ignition is not above the threshold, then at 318, the initial washer fluid injection rate and amount is selected to be used during the upcoming torque reduction. Then the routine ends.

If the likelihood of pre-ignition exceeds the threshold likelihood, at 320, the washer fluid injection rate and/or amount is adjusted, for example increased, from the initial injection rate and amount to a final rate and amount that decreases the likelihood of pre-ignition. In one example, the washer fluid injection rate may be increased above the initial injection rate, decreasing the air/fuel ratio below 0.8 lambda to reduce the likelihood of pre-ignition. As such, maintaining stoichiometry may provide the lowest risk of pre-ignition, however this dependency may be mapped for each engine. The rate and/or amount of fluid injection may be increased responsive to the difference between the likelihood of pre-ignition and the threshold likelihood. In one example, the rate and/or amount of fluid injection may be increased by a larger as the likelihood of pre-ignition exceeds the threshold likelihood.

At 322, the washer fluid injection rate is adjusted based on an estimated air/fuel ratio and feedback (regarding further pre-ignition occurrence) from a knock sensor. The air/fuel ratio may be calculated based on fuel and fluid injection settings and engine operating conditions, or the air/fuel ratio may be measured, such as by an exhaust oxygen sensor.

The rate may be further determined based on a pre-ignition count if pre-ignition occurs during the injection. In addition, the rate may also be determined based on the engine knock rate after clean out is completed. If knock rate is still high after the initial clean out, a clean out procedure of longer duration may have to be performed.

For example, it may be determined whether the air/fuel ratio is below a threshold air/fuel ratio, wherein the threshold air/fuel ratio is based on engine operating conditions and pre-ignition likelihood. If the air/fuel ratio exceeds the threshold ratio, the rate and/or amount of washer fluid injection may be increased to lower the air/fuel ratio. If the washer fluid injection rate and/or amount cannot be increased further, it may be determined to maintain washer fluid injection at a limit during the upcoming torque reduction, and to provide a remaining amount of torque reduction by retarding spark timing. Alternatively, if water is available for injection, water may by injected in lieu of washer fluid to reduce the likelihood of pre-ignition. In one example, pre-ignition may be mitigated by increasing the washer fluid injection rate in response to the detection of pre-ignition by a knock sensor. Also, if pre-ignition occurs after increasing the washer fluid injection rate, washer fluid injection may be suspended and spark retard may be used to affect the upcoming torque reduction.

Therefore once in the pre-ignition risk region, or when the inferred model indicates a high risk of pre-ignition due to elevated spark plug tip temperatures, the injection of fuel with washer fluid (methanol) is adjusted to maintain stoichiometry. Additionally based on feedback of detected pre-ignition, further enrichment may take place, finally followed by suspension of methanol injection. As a last step of pre-ignition mitigation, load reduction (torque limiting via adjustments to an intake throttle) may take place.

In other examples, the engine may be operated in different manners, along with the injection of water or washer fluid, to clean deposits from the plug and the combustion chamber. Based on feedback or model indicating spark plug fouling or chamber deposits, steps can be taken to clean the deposits that are aided by water or methanol injection. For example, the controller may first attempt to burn off deposits by keeping more heat in the chamber. Since injecting water or methanol slows combustion burn rates down, it avoids knock and detonation, therefore allowing more spark advance to be used. Typically, as spark is advanced (to earlier in the cycle), exhaust temperature decreases, and spark plug tip temperatures increase. So if spark plug and/or combustion chamber cleaning is needed, not only will the use of water or methanol allow the engine to potentially run advanced of the typical borderline (knock limited) spark advance, it may also allow the engine to be run advanced of MBT spark timing, allowing more heat transfer to the spark plug and allow burning of spark plug and combustion chamber deposits. A second method used by the controller for burning off soot involves using water or washer fluid in a de-carbonizing method. This method increases the rate of introduction of water or methanol based washer fluid to create steam in the chamber and clean the deposits. Typically this could have been accomplished by significantly increasing engine idle speed and introducing the water to the induction system. Herein, if carbon cleaning is needed, the water or washer fluid can be introduced at significantly increased flow raters during a torque reduction request in lieu of spark retard. For example, during a transmission shift spark, instead of retarding spark to reduce torque, the water or washer fluid injection rate is increased to activate the torque reduction, which also results in cleaning of the chamber deposits. In this way it is possible to avoid spark plug fouling, and clean combustion chamber deposits for increased performance and reduced knock, leading to better fuel economy.

Figure 4:
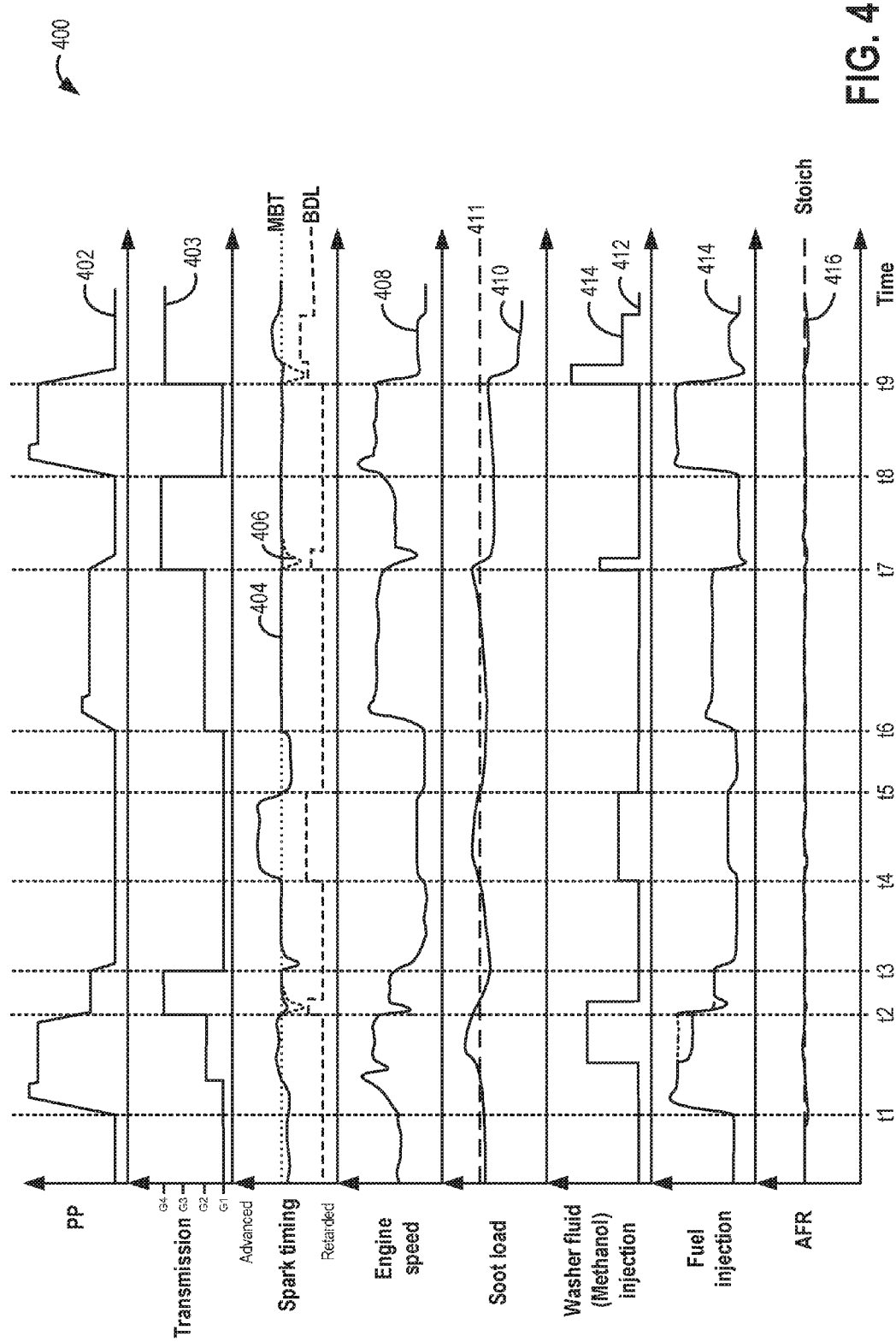
FIG. 4 shows example adjustments that may be used to opportunistically inject washer fluid and reduce spark plug soot load.

FIG. 4 shows an example sequence 400 illustrating combustion chamber soot load reduction using washer fluid injection, spark timing adjustments, and engine idling speed adjustments. The horizontal axis (x-axis) denotes time and the vertical markers t1-t9 identify significant times during soot load reduction. The first plot from the top shows variation in pedal position (line 402) over time. The second plot (line 403) shows a change in transmission gear selection over time. Four gear operations are depicted herein at G1-G4 of progressively decreasing gear ratio. The third plot (line 404) shows variation in spark timing over time. The fourth plot (line 408) shows variation in engine speed over time. The fifth plot (line 410) shows variation of a spark plug soot load over time. The sixth plot (line 412) shows the change in a washer fluid (methanol) injector flow rate over time. The seventh plot (line 414) shows variation of a fuel flow rate over time. The eight plot (line 416) shows variation of an exhaust air/fuel ratio over time.

Prior to time t1, the engine is spinning at a substantially constant speed with the transmission in a first transmission gear having a first, higher gear ratio. The engine is operating at stoichiometry and no methanol is being injected at this time since the soot load of the combustion chamber is below threshold 411. At time t1, responsive to an operator pedal tip-in event, fuel flow to the engine is increased to meet the increase in torque demand. In addition, the engine speed is raised to maintain a higher vehicle speed. Between t1 and t2, a transmission gear is changed from the first gear to a second gear, the second gear having a lower gear ratio than the first gear, resulting in a decrease in engine speed. Due to the increase in engine torque output, the soot load of the combustion chamber also starts to increase. The combustion chamber soot load is predicted based on one or more of a modeled spark plug tip temperature, engine temperature, exhaust air-fuel ratio, as well as an engine knock count, and/or pre-ignition count. The engine may be operating with at least some spark retard (herein also referred to as spark reserve) to reduce knock incidence.

Between t1 and t2, the soot load exceeds the threshold and combustion chamber cleaning is required. The controller anticipates an upcoming transmission gear shift at t2 (such as based on vehicle route data). Therefore, the spark plug cleaning is initiated responsive to the elevated soot load such that at least a portion of the cleaning coincides with the transmission gear shift at t2. In particular, methanol injection amount and rate is increased between t1 and t2, while a gasoline fuel injection amount is corresponding decreased (relative to what would have been injected, as indicated at the dashed line) to maintain combustion at stoichiometry. At the same time, spark timing is advanced to MBT (as depicted) or advanced of MBT. At the same time, an intake throttle opening may be increased (not shown) to maintain torque demand. In particular, the throttle opening may be increased to compensate for any torque loss from the usage of spark advance and fluid injection.

At time t2, an operator tip-out event occurs resulting in the expected transmission gear shift (in the depicted example, an upshift from second gear to fourth gear, the fourth gear having a higher gear ratio than each of the first and the second gear). As a result of the gearshift, the engine speed decreases. The vehicle speed holds at least for a while after the gearshift. At t2, the soot load is still above the threshold and the combustion chamber cleaning is continued opportunistically while also providing at least some of the torque reduction required for the transmission shift. In particular, the amount of washer fluid (including methanol) injection is maintained. The high amount and rate of washer fluid injection decreases the amount of engine torque during the transmission shift while simultaneously reducing the combustion chamber deposits due to the generation of steam. A remainder of the required torque reduction is provided by retarding spark by a smaller amount. As such, if washer fluid injection was not concurrently used, a larger degree of spark retard would have been required during the torque reduction (as indicated by dashed line 406), which would have caused a larger fuel penalty. The injection of washer fluid results in a cooling of the combustion chamber, which also increases the amount of spark advance allowed before spark becomes borderline limited, as indicated by the advance in borderline knock limit (BDL) during the injection. Due to the combustibility of methanol (due to its hydrocarbon content), fuel injection settings to the engine are also adjusted during the washer fluid injection. In the depicted example, the engine pre-ignition likelihood is higher at t2. Therefore, fuel injection is adjusted in response to washer fluid injection so as to operate the engine at an air-fuel ratio around stoichiometry. The fuel injection is then returned to a nominal flow after washer fluid injection is stopped.

At time t3, the operator tips out, the transmission is shifted to the first gear, fuel injection is decreased and the engine enters an idling condition. Since the torque reduction at time t3 occurs while the spark plug soot load is lower than the threshold soot load, washer fluid is not concurrently injected. Instead, torque reduction during the shift is achieved by retarding spark timing from MBT timing, a degree of the spark timing retard applied based on an amount of torque reduction requested during the shift.

At time t4, while the engine is in an idling condition, the spark plug soot load again increases over the threshold soot load. Responsive to the increase in soot load, the engine idling speed is increased between t4 and t5. In addition, washer fluid injection is increased, and spark timing is advanced from MBT spark timing for a number of combustion cycles. In addition, to maintain the higher engine speed, an intake throttle opening may be increased (not shown). As a result, the spark plug tip temperature is increased to burn off the accumulated soot. Due to the cooling effects of the injected methanol in the washer fluid, BDL may be advanced, allowing the spark timing to be advanced from MBT, the spark timing advanced further than would have been possible if fluid was not injected. Herein, during the cleaning, spark timing is advanced of MBT for torque reserve and retarded closer to MBT for disturbance load rejection. In the depicted example, the engine pre-ignition likelihood is lower at t4. Fuel injection is adjusted based on the increase in engine intake air to maintain the higher engine idling speed while accounting for the added methanol so as to maintain exhaust air-fuel ratio at stoichiometry. The increased idling speed, the injection of methanol, and the use of advanced spark timing may be maintained until the spark plug soot load is sufficiently reduced.

At time t5, the spark plug soot load is reduced below the threshold soot load, so the idling speed is reduced to the lower idling speed, washer fluid injection is suspended, and fuel injection resumes nominal settings. Additionally, spark timing is retarded from MBT spark timing to maintain some torque reserve at idle for load rejection.

At time t6, the operator tips in, transmission is shifted from first to second gear, and engine speed, vehicle speed, and fuel injection are increased. While the engine operates at an increased engine speed, the soot load increases reaching the threshold soot load just before. A spark plug cleaning is delayed in anticipation of an upcoming gear shift.

At time t7, the operator tips out while shifting the transmission from second gear to fourth gear. In response to the transmission shift, engine speed decreases. The degree of torque reduction requested at t7 may be the same as the degree of torque reduction requested at t3, however unlike at t3 where the soot load is lower, at t7, the soot load is higher at t7. Therefore while the torque reduction at t3 is provided by retarding spark timing, at time t7, the same torque reduction is provided by injecting an amount of the washer fluid into an intake passage of the engine, downstream of the throttle, while maintaining spark ignition timing. The fluid injection allows for the torque reduction request to be met while also cleaning the spark plug. In the absence of fluid injection, the amount of spark retard required to provide the torque reduction is show at dashed line 406. Thus by reducing the need for spark retard, fuel economy benefits are provided while the spark plug is cleaned. Fuel injection is again adjusted during the fluid injection in view of a higher likelihood of pre-ignition to operate the engine at an air-fuel ratio that is around stoichiometry. In particular, the likelihood of pre-ignition at t7 is higher than the likelihood of pre-ignition at t2, therefore the degree of enrichment relative to stoichiometry of the engine air-fuel ratio is also higher.

At time t8, the operator tips in, shifting gears from gear four to gear one. Engine speed and fuel flow rate are increased to meet operator torque demand. The spark plug soot load is below the threshold soot load, and so it may be determined to not inject water or washer fluid during the torque reduction due to the transmission shift.

At time t9, the operator tips out again, shifting the transmission from first gear to fourth gear. Though the spark plug soot load is below a threshold soot load, it may be decided to opportunistically reduce the spark plug soot load during the upcoming torque reduction. In one example, the decision to opportunistically reduce the spark plug soot load may be responsive to the extent of the torque reduction. At time t9, the torque reduction corresponds to a transmission shift from first gear to fourth gear, and so is a large torque reduction. The reduction in torque due to the transmission shift at time t9 has the same initial torque level as the transmission shift at time t2. However, the torque reduction at time t9 is larger than the torque reduction at t2. At time t9, the transmission is shifted from fourth to first gear, whereas at time t2, the transmission is shifted from fourth to second gear. Likewise, the rate and amount of methanol (washer fluid) injected at time t9 is larger than the methanol injection rate and amount at time t2, as shown in line 412. Additionally, after the transmission shift and corresponding torque reduction at time t9, the soot load may be reduced further by operating the engine at an increased idling speed.

After the torque reduction request at time t9, the engine may be operated at a second idling speed, the second idling speed higher than the first idling speed, while maintaining injection of a water-based fluid to further reduce the soot load. The second idling speed may be reduced to the first idling speed once the soot load is reduced.

In one example, a first torque reduction request may be from an initial torque level to a lower final torque level, and a second torque reduction request may be from the same initial torque level to a higher final torque level, so the second torque reduction request corresponds to a larger reduction in torque than the first torque reduction request. Alternatively, the torque reduction may be from different initial torque levels. If the spark plug soot load exceeds a threshold soot load for both the first and second torque reduction requests, a water-based fluid may be injected to reduce the spark plug soot load, while maintaining spark timing. Due to the larger torque reduction requested in the first torque reduction request, the water-based fluid may be injected at a higher flow rate during the first torque reduction request as compared to the second, smaller, torque reduction request. Likewise, if the spark plug soot load is below a threshold soot load, spark may be retarded to reduce engine torque, while not injecting the water-based fluid. For the first torque reduction request, wherein a larger reduction in torque is requested, a higher degree of spark retard may be used during the torque reduction, whereas for the second torque reduction request, wherein a smaller reduction in torque is requested, a lower degree of spark retard may be used during the torque reduction. The higher degree of spark retard used during the first, larger, torque reduction may result in a larger reduction in torque, and the lower degree of spark retard used during the second, smaller, torque reduction may result in a smaller reduction in torque.

In another example, a first torque reduction request may be from an initial torque level to a final torque level, below the initial torque level, and a second torque reduction request may be from a lower initial torque level to a lower final torque level, below the final torque level of the first torque reduction request, though the amount of torque reduction for the first and second torque reduction requests is the same. If the spark plug soot load exceeds a threshold soot load, a water-based fluid may be injected at a rate/amount that is substantially equal for the first and second torque reduction requests, while maintaining spark timing, to result in the same amount of torque reduction. Likewise, if spark plug soot load is below a threshold soot load, it may be determined to retard spark, while not injecting the water-based fluid, during the first and second torque reduction requests by the same amount to reduce the torque by substantially equal amounts for both the first and second torque reduction requests. In this way, the spark plug soot load may be reduced by injecting water or washer fluid into a combustion chamber while advancing spark timing during a torque reduction.

The technical effect of using water or washer fluid injection is that a spark plug and a combustion chamber can be decarbonized, reducing soot fouling and the incidence of fouled plug induced misfire, and fouled chamber induced knock, and pre-ignition. The chamber cooling resulting from the injection improves the knock limit of the engine, and allows spark timing to also be advanced further and/or for a shorter number of cycles to effectively raise a spark plug tip temperature to burn off a spark plug soot load, as well as retain more heat in a cylinder, burning off chamber deposits. By opportunistically performing the spark plug and combustion chamber cleaning using washer fluid injection during a torque reduction event, at least a portion of the torque reduction can be provided by the injected fluid, reducing the need for spark retard during the torque reduction. As such, this improves the fuel economy of the engine. In addition, spark plug life is extended, improving engine performance.

In one example, a method for an engine comprises, in response to a torque reduction request received while a predicted engine soot load is higher than a threshold load, injecting a fluid into an intake manifold, and adjusting spark ignition timing based on the fluid injection. The preceding example method may, additionally or optionally, adjusting the spark ignition timing based on the fluid injection includes adjusting based on one or more of an amount of fluid injected, a rate of fluid injection, and an alcohol content of the injected fluid. In any or all of the preceding examples, additionally or optionally, the amount of fluid injected and the rate of fluid injection are based on each of the predicted engine soot load and the torque reduction request, the rate of fluid injection and the amount of fluid injected increased as the predicted engine soot load increases, and as more torque reduction is requested. In any or all of the preceding examples, additionally or optionally, the predicted engine soot load includes one of a predicted spark plug soot load and a predicted combustion chamber soot load. In any or all of the preceding examples, additionally or optionally, the predicted engine soot load is predicted based on one or more of a modeled spark plug tip temperature, an engine misfire count, an engine pre-ignition count, an indication of spark plug fouling, and a measured ion leakage current. In any or all of the preceding examples, additionally or optionally, the fluid is one of water and washer fluid, and wherein the washer fluid includes methanol. In any or all of the preceding examples, additionally or optionally, further comprises increasing engine idling speed while injecting the fluid, the increasing based on one or more of the amount of fluid injected, the rate of fluid injection, and the alcohol content of the injected fluid. In any or all of the preceding examples, additionally or optionally, the torque reduction request includes one of a transmission shift, and traction control. In any or all of the preceding examples, additionally or optionally, adjusting spark timing includes maintaining spark timing. In any or all of the preceding examples, additionally or optionally, adjusting spark timing include advancing spark timing. In any or all of the preceding examples, additionally or optionally, further comprises, in response to a torque reduction request received while the predicted engine soot load is lower than the threshold load, retarding spark timing.

In another example, a method for an engine comprises, in response to a first torque reduction request from an initial torque level, retarding spark timing, and, in response to a second torque reduction request from the initial torque level, injecting a water-based fluid into an intake passage of the engine while maintaining spark ignition timing, wherein an amount of torque reduction requested during the first torque reduction request and the second torque reduction request is same. In any the preceding example method, additionally or optionally, during the first torque reduction request, a spark plug soot load is lower, and during the second torque reduction request, the spark plug soot load is higher, and during both the first and second torque reduction request, the spark plug soot load is predicted based on each of a modeled spark plug tip temperature, an engine misfire count, an engine pre-ignition count, an indication of spark plug fouling, and a measured ion leakage current. In any or all of the preceding examples, additionally or optionally, the water-based fluid includes one of water and washer fluid, wherein the washer fluid includes methanol, and wherein injecting the fluid into the intake passage includes injecting downstream of an intake throttle. In any or all of the preceding examples, additionally or optionally, during the first torque reduction request, a degree of spark timing retard is based on an amount of torque reduction requested, the degree of spark timing retard increased as the amount of torque reduction increases, and wherein during the second torque reduction request, a rate of fluid injection is based on the amount of torque reduction requested and further based on the soot load, the rate of fluid injection increased as the amount of torque reduction requested increases and as the soot load exceeds a threshold load. In any or all of the preceding examples, additionally or optionally, the threshold load is based on a pre-ignition count of the engine, the threshold load decreased as the pre-ignition count increases. In any or all of the preceding examples, additionally or optionally, further comprises, after the first torque reduction request, operating the engine at a first idling speed, and after the second torque reduction request, operating the engine at a second idling speed, the second idling speed higher than the first idling speed. In yet another example, an engine system comprises an engine including a cylinder, a first injector for delivering a first fluid into the cylinder, a second injector for delivering a second fluid upstream of the cylinder, a transmission including a plurality of gears, a spark plug, a knock sensor, and a controller with computer-readable instructions stored on non-transitory memory for modeling a soot load of the spark plug based on engine operating conditions and, in response to the soot load being higher than a threshold load, injecting the second fluid while advancing spark ignition timing by a smaller amount if a torque reduction event is predicted, and advancing spark ignition timing by a larger amount if the torque reduction event is not predicted. In any or all of the preceding examples, additionally or optionally, the controller includes further instructions for adjusting injection of the first fluid responsive to the injecting of the second fluid, decreasing the injection of the first fluid as the injecting of the second fluid increases, the first fluid including gasoline, the second fluid including methanol, and the torque reduction event including a transmission gear shift. In any or all of the preceding examples, additionally or optionally, the controller includes further instructions for, after the torque reduction event, increasing engine idling speed by a smaller amount while injecting the second fluid when the torque reduction event is predicted, and increasing engine idling speed spark by a larger amount while advancing spark ignition timing when the torque reduction event is not predicted. In any or all of the preceding examples, additionally or optionally, the controller includes further instructions to detect and differentiate knock and pre-ignition based on an output of the knock sensor, and adjusting the threshold load based on a pre-ignition count of the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
in response to a torque reduction request received while a predicted engine soot load is higher than a threshold load,
injecting a fluid into an intake manifold or a cylinder, and;
adjusting spark ignition timing based on the fluid injection.

2. The method of claim 1, wherein the adjusting spark ignition timing is based on the fluid injection includes adjusting based on one or more of an amount of fluid injected, a rate of fluid injection, an alcohol content of the injected fluid, an amount of heat transfer desired at the spark plug, a total engine torque output desired.

3. The method of claim 2, wherein the amount of fluid injected and the rate of fluid injection are based on each of the predicted engine soot load and the torque reduction request, the rate of fluid injection and the amount of fluid injected increased to a limit as the predicted engine soot load increases, and as more torque reduction is requested.

4. The method of claim 1, wherein the predicted engine soot load includes one of a predicted spark plug soot load and a predicted combustion chamber soot load.

5. The method of claim 4, wherein the predicted spark plug soot load is predicted based on one or more of a modeled spark plug tip temperature, an engine misfire count, an indication of spark plug fouling, and a measured ion leakage current, and wherein the predicted combustion chamber soot load is based on one or more of an engine pre-ignition count, an engine knock count, and an alcohol content of the injected fluid.

6. The method of claim 1, wherein the fluid is one of water and washer fluid, and wherein the washer fluid includes methanol.

7. The method of claim 2, further comprising, increasing engine idling speed while injecting the fluid, the increasing based on one or more of the amount of fluid injected, the rate of fluid injection, and the alcohol content of the injected fluid.

8. The method of claim 1, wherein the torque reduction request includes one of a transmission shift, and traction control.

9. The method of claim 1, wherein adjusting spark timing includes maintaining spark timing.

10. The method of claim 1, wherein adjusting spark timing include advancing spark timing of MBT for torque reduction and heating a spark plug, the adjusting including retarding spark timing from MBT for torque reduction only.

11. The method of claim 10, further comprising, in response to a torque reduction request received while the predicted engine soot load is lower than the threshold load, retarding spark timing.

12. A method for an engine, comprising:
in response to a first torque reduction request from an initial torque level, retarding spark timing; and
in response to a second torque reduction request from the initial torque level, injecting a water-based fluid into the engine while maintaining spark ignition timing, wherein an amount of torque reduction requested during the first torque reduction request and the second torque reduction request is same.

13. The method of claim 12, wherein during the first torque reduction request, a spark plug soot load is lower, and during the second torque reduction request, the spark plug soot load is higher, and wherein during both the first and second torque reduction request, the spark plug soot load is predicted based on each of a modeled spark plug tip temperature, an engine misfire count, an engine pre-ignition count, an indication of spark plug fouling, and a measured ion leakage current.

14. The method of claim 12, wherein the water-based fluid includes one of water and washer fluid, wherein the washer fluid includes methanol, and wherein injecting the fluid includes injecting into an intake passage or injecting directly into a cylinder.

15. The method of claim 13, wherein during the first torque reduction request, a degree of spark timing retard is based on an amount of torque reduction requested, the degree of spark timing retard increased as the amount of torque reduction increases, and wherein during the second torque reduction request, a rate of fluid injection is based on the amount of torque reduction requested and further based on the soot load, the rate of fluid injection increased as the amount of torque reduction requested increases and as the soot load exceeds a threshold load.

16. The method of claim 15, wherein the threshold load is based on a pre-ignition count of the engine, the threshold load decreased as the pre-ignition count increases.

17. The method of claim 12, further comprising, after the first torque reduction request, operating the engine at a first idling speed, and after the second torque reduction request, operating the engine at a second idling speed, the second idling speed higher than the first idling speed.

18. An engine system, comprising:
an engine including a cylinder;
a first injector for delivering a first fluid into the cylinder;
a second injector for delivering a second fluid upstream of the cylinder;
a transmission including a plurality of gears;
a spark plug; and
a controller with computer-readable instructions stored on non-transitory memory for:
modeling a soot load of the spark plug based on engine operating conditions; and
in response to the soot load being higher than a threshold load,
injecting the second fluid while advancing spark ignition timing by a smaller amount if a torque reduction event is predicted; and
advancing spark ignition timing by a larger amount if the torque reduction event is not predicted.

19. The system of claim 18, wherein the controller includes further instructions for:
adjusting injection of the first fluid responsive to the injecting of the second fluid, wherein the injection of the first fluid is decreased as the injecting of the second fluid increases, the first fluid including gasoline, the second fluid including methanol, and wherein the torque reduction event includes a transmission gear shift.

20. The system of claim 18, wherein the controller includes further instructions for:
after the torque reduction event, increasing engine idling speed by a smaller amount while injecting the second fluid when the torque reduction event is predicted; and
increasing engine idling speed spark by a larger amount while advancing spark ignition timing when the torque reduction event is not predicted.

* * * * *